United States Patent [19]
Mazzella et al.

[11] Patent Number: 6,061,230
[45] Date of Patent: May 9, 2000

[54] ELECTRIC POWER DISTRIBUTION PANELBOARD/SWITCHBOARD ASSEMBLY

[75] Inventors: Kevin D. Mazzella, Durham; Kevin F. Nolan, Hillsborough; Rick A. Vonrotz, Mebane; Thomas F. Vrnak, Chapel Hill; Melanie A. Lewis, Durham, all of N.C.; Grady W. Broadnax, Jr., Bristol, Conn.; Robert R. Leclair, Lewiston, Me.; Robert B. Wallace, Mebane, N.C.; Jeremy Palmer, Chapel Hill, N.C.; Hamon L. Craft, Eflan, N.C.

[73] Assignee: General Electric Company, Schenectady, N.Y.

[21] Appl. No.: 08/986,892

[22] Filed: Dec. 8, 1997

[51] Int. Cl.[7] .................................................. H05K 7/16
[52] U.S. Cl. ........................ 361/627; 361/610; 361/612; 361/625; 361/644; 439/805; 439/810; 439/814; 174/88 B; 174/70 B; 403/384; 317/120
[58] Field of Search ...................... 361/610–616, 361/622, 627, 634, 638, 640, 644, 650, 648, 649, 652, 668; 439/121, 110, 721, 810, 212–213, 711, 717, 796–798, 805, 814; 174/68.1, 72 B, 52.1, 129 B, 34, 88 B, 70 B, 71 B, 133 B, 149 B, 171; 324/156; 403/396, 384, 29, 408.1; 317/120, 119, 112–118

[56] References Cited

U.S. PATENT DOCUMENTS

| | | |
|---|---|---|
| 3,192,446 | 6/1965 | Meacham ............................. 317/119 |
| 3,356,906 | 12/1967 | Lamb et al. . |
| 3,793,564 | 2/1974 | Salvati et al. . |
| 3,966,296 | 6/1976 | Ericson . |
| 4,020,400 | 4/1977 | Hawkes, Jr. et al. . |
| 4,093,970 | 6/1978 | M'Sadoques et al. . |
| 4,281,699 | 8/1981 | Grube ..................................... 411/176 |
| 4,358,815 | 11/1982 | Koslosky et al. . |
| 4,472,761 | 9/1984 | Koslosky et al. . |
| 4,700,271 | 10/1987 | Iio et al. . |
| 4,752,233 | 6/1988 | Morby et al. . |
| 4,752,239 | 6/1988 | Vagnozzi . |
| 4,775,324 | 10/1988 | Norden . |
| 4,783,718 | 11/1988 | Raabe et al. . |
| 5,053,918 | 10/1991 | Norden . |
| 5,160,284 | 11/1992 | Krom . |
| 5,172,300 | 12/1992 | Morby et al. . |
| 5,299,945 | 4/1994 | Norden . |
| 5,351,165 | 9/1994 | Hancock . |
| 5,642,256 | 6/1997 | Pugh et al. ............................. 361/615 |
| 5,749,671 | 5/1998 | Cha ........................................ 403/384 |

*Primary Examiner*—Leo P. Picard
*Assistant Examiner*—Michael Datskovsky
*Attorney, Agent, or Firm*—Carl B. Horton; Cantor Colburn LLP

[57] ABSTRACT

A panelboard/switchboard assembly for accommodating bolt-on modules, plug-in modules and lugs. The panelboard/switchboard includes vertical, edge forward bus bars having a plurality of openings formed therein. The edge forward alignment allows plug-in modules to be mounted to the bus bars. The openings in the bus bars receive bolts for mounting straps to the bus bars and for mounting lugs to the bus bars. The openings have a shape having at least one linear element and receive a bolt having an anti-rotation portion with a similar shape. The interference between the opening and the anti-rotation portion of the bolt prevents the straps, and the modules connected to the straps, from rotating.

20 Claims, 8 Drawing Sheets

ELECTRIC POWER DISTRIBUTION PANELBOARD/SWITCHBOARD ASSEMBLY

BACKGROUND OF THE INVENTION

1. Field of the Invention

The invention relates generally to electric power distribution panelboards/switchboards and in particular to a panelboard/switchboard assembly accommodating both plug-in and bolt-on type modules.

2. Prior Art

Circuit breakers and disconnect switches for power distribution panelboards or switchboards may be plug-in type or bolt-on type. Panelboards and switchboards have been designed and manufactured to accept either bolt-on or plug-in circuit breakers and disconnect switches. Manufacturers of panelboards and switchboards have an interest in standardizing the design of panelboards into one common platform to reduce manufacturing and inventory costs. Customers have an interest in a common platform to provide flexibility in changing from one type of circuit breaker or disconnect switch to another in the field.

One approach to accommodate both plug-in and bolt-on modules is described in U.S. Pat. No. 3,356,906. Interchangeable connections are made using specially shaped connectors with a free end extending across the panelboard to connect with bolt-on modules and a blade extension for connection with plug-in modules. Since the free end of the connector is not supported, the connector tends to turn and twist under the force to connect a plug-in module as well as under the weight of the module itself. Additionally, modules must be equipped with custom built-in slots to receive the blades. U.S. Pat. No. 4,358,815 describes another design to accommodate both bolt-on and plug-in modules. While these prior art designs are well suited for the intended applications, there is a need in the art for improved panelboards that can receive a variety of modules using a minimal number of components.

SUMMARY OF THE INVENTION

The above-discussed and other drawbacks and deficiencies of the prior art are overcome or alleviated by the panelboard/switchboard assembly of the present invention. The panelboard/switchboard assembly accommodates bolt-on modules, plug-in modules and lugs. The panelboard/switchboard assembly includes vertical, edge forward bus bars having a plurality of openings formed therein. The edge forward alignment allows plug-in modules to be mounted to the bus bars. The openings in the bus bars receive bolts for mounting straps to the bus bars and for mounting lugs to the bus bars. The openings have a shape having at least one linear element and receive a bolt having an anti-rotation portion with a similar shape. The interference between the opening and the anti-rotation portion of the bolt prevents the straps, and the modules connected to the straps, from rotating.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
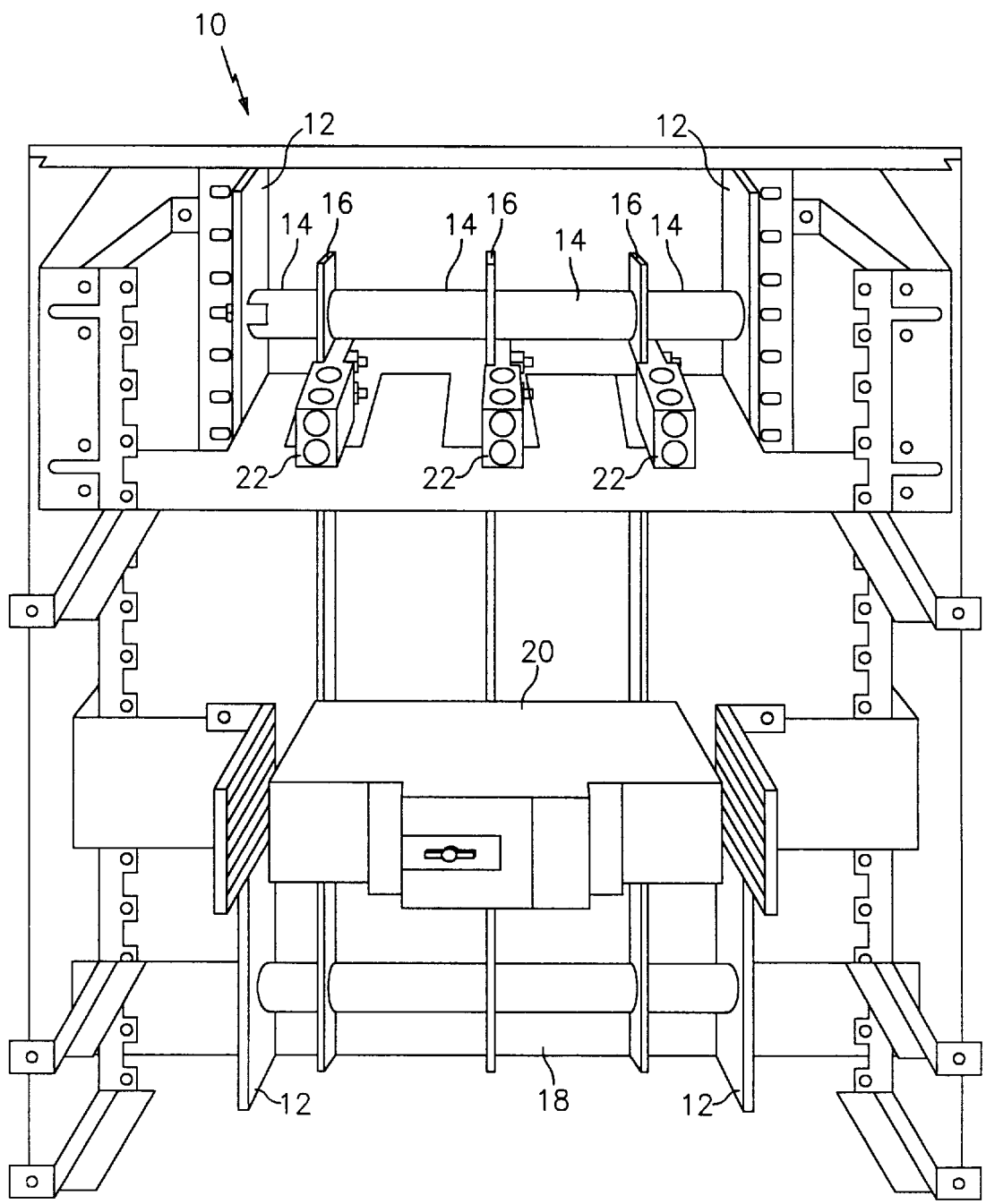
FIG. 1 is a front view of a portion of a panelboard in accordance with the present invention having lugs mounted directly to the bus bars.

The present invention is directed to improved components for use in panelboards and switchboards and is referred to generally as a panelboard/switchboard assembly. The description of the invention is with reference to a panelboard but it is understood that the invention is also applicable to switchboards. FIG. 1 is a front view of a portion of a panelboard assembly, shown generally at 10, in accordance with the present invention. The panelboard assembly 10 includes support brackets 12 which support tubular, insulative spacers 14 placed between bus bars 16. Although three bus bars 16 are shown in FIG. 1, it is understood that more or less bus bars could be utilized and multiple bus bars may be provided for each phase. Each bus bar 16 has a height, depth and width, the width being the smallest dimension of the three. The bus bars are mounted with an edge forward so that the edge of the bus bar, corresponding to the width, is facing the front of the panelboard assembly as shown in FIG. 1. In a preferred embodiment, the plane of the width is substantially parallel to the rear wall 18 of the panelboard 10 and the plane of the depth is substantially perpendicular to the rear wall 18 of the panelboard assembly.

Figure 2:
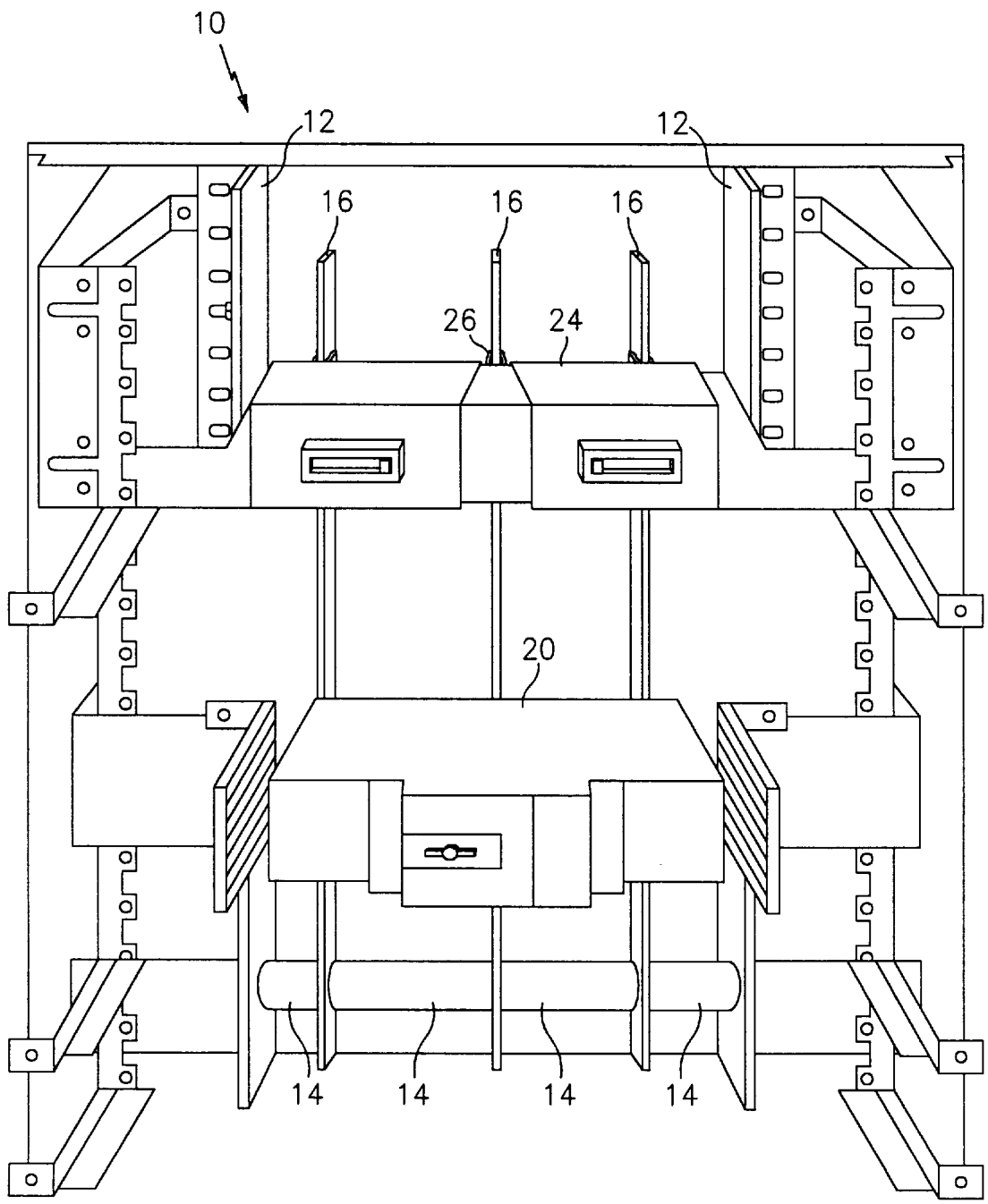
FIG. 2 is a front view of a portion of a panelboard having a plug-in module mounted thereto.

FIG. 1 shows a first module 20 mounted to the panelboard assembly 10. Module 20 may be any known module such as a circuit breaker, electric switch, monitoring device, etc. As will be described herein with reference to FIGS. 5–8, the module 20 is connected to bus bars 16 through straps bolted to the bus bars 16. Also shown in FIG. 1 are lugs 22 connected directly to bus bars 16. Lugs 22 provide access points for coupling cables to the bus bars 16. FIG. 2 shows another module 24 having plug-in connectors 26 engaging bus bars 16. Plug-in connectors 26 are unshaped conductive components that receive the edge of the bus bar 16. Additional details of the plug-in connectors 26 are found in U.S. Pat. No. 5,172,300, assigned to the assignee of the present invention, the contents of which are incorporated herein for reference.

Figure 3:
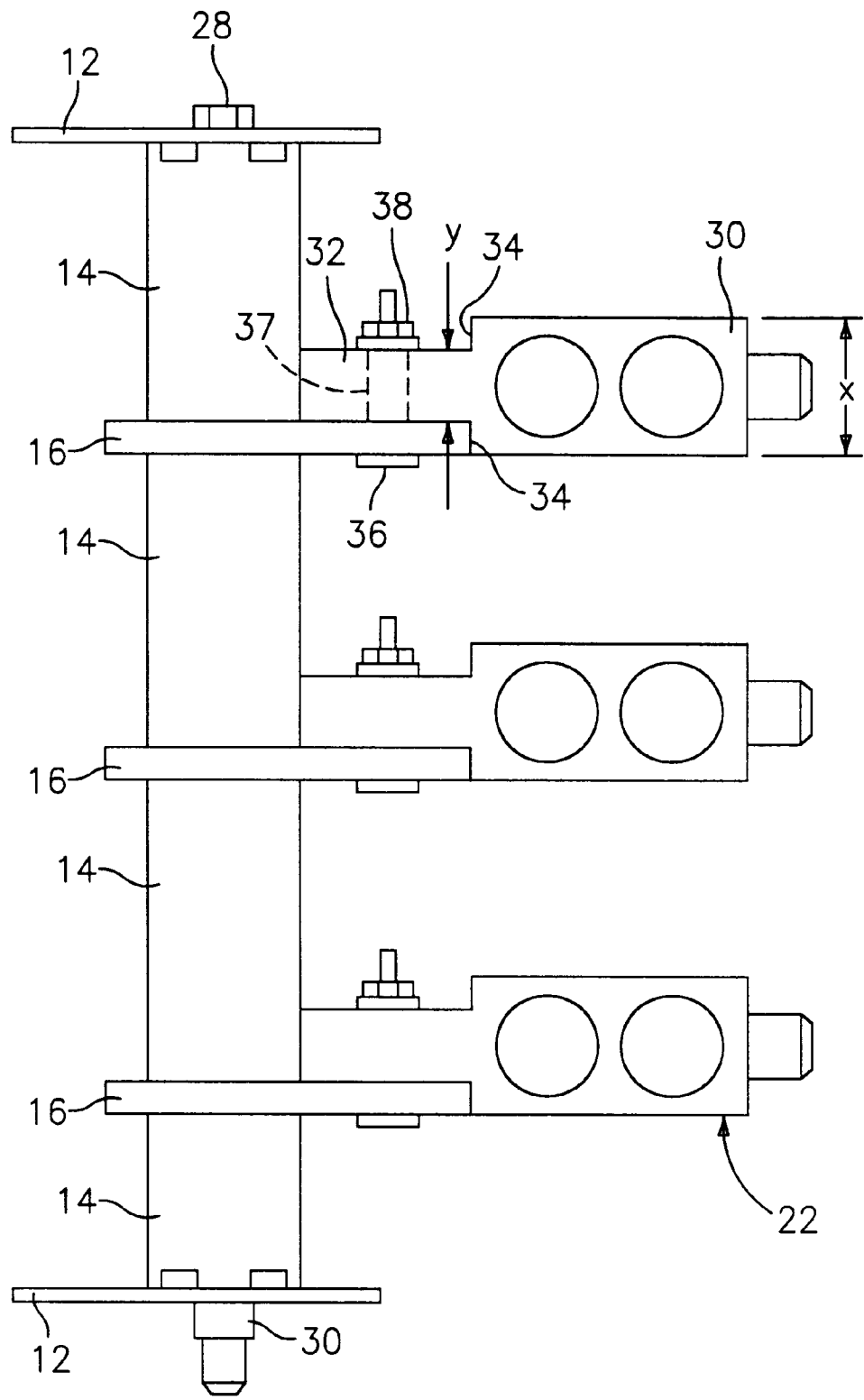
FIG. 3 is a top view of the lugs mounted to the bus bars.
Figure 4:
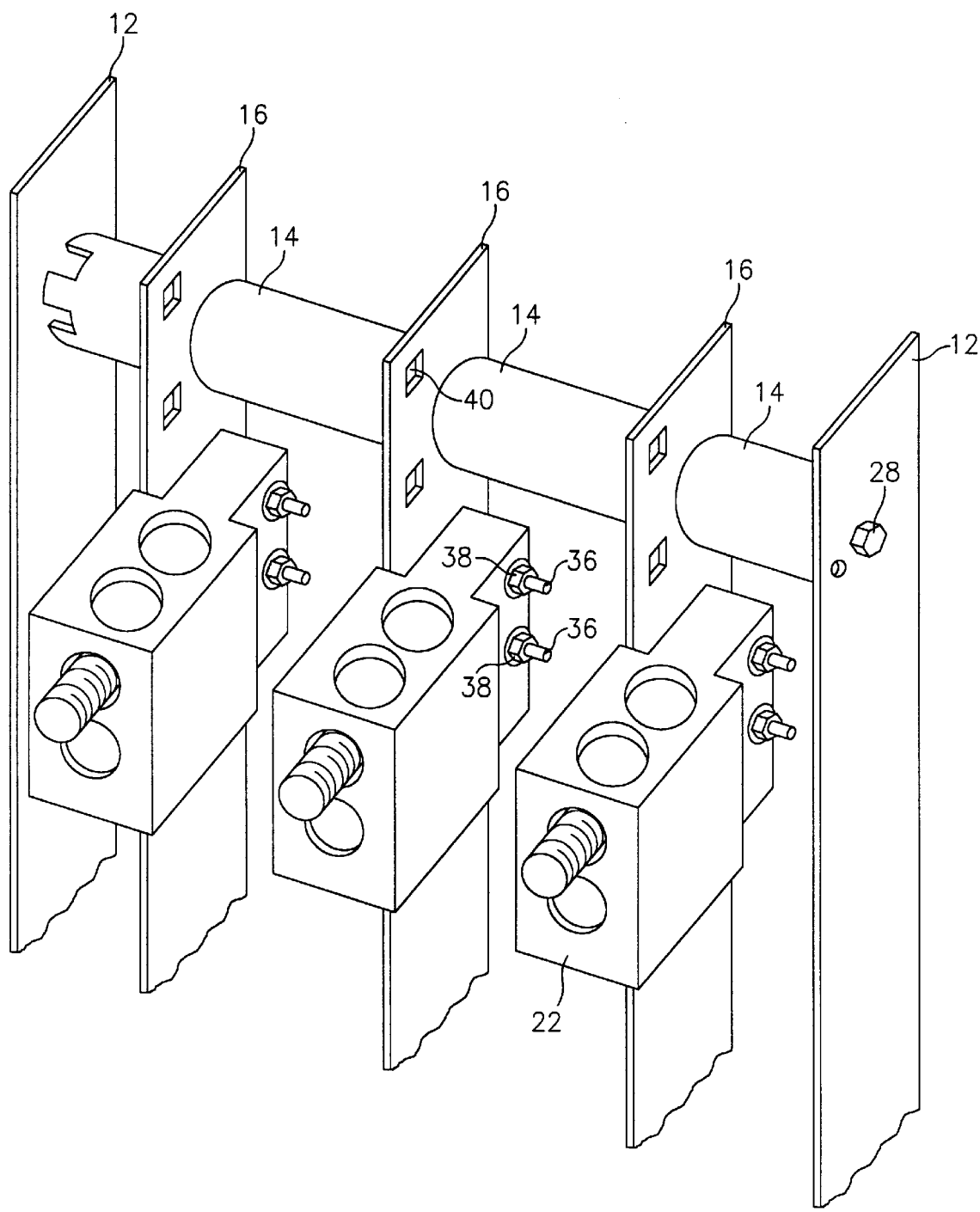
FIG. 4 is a perspective view of the lugs mounted to the bus bars.
Figure 5:
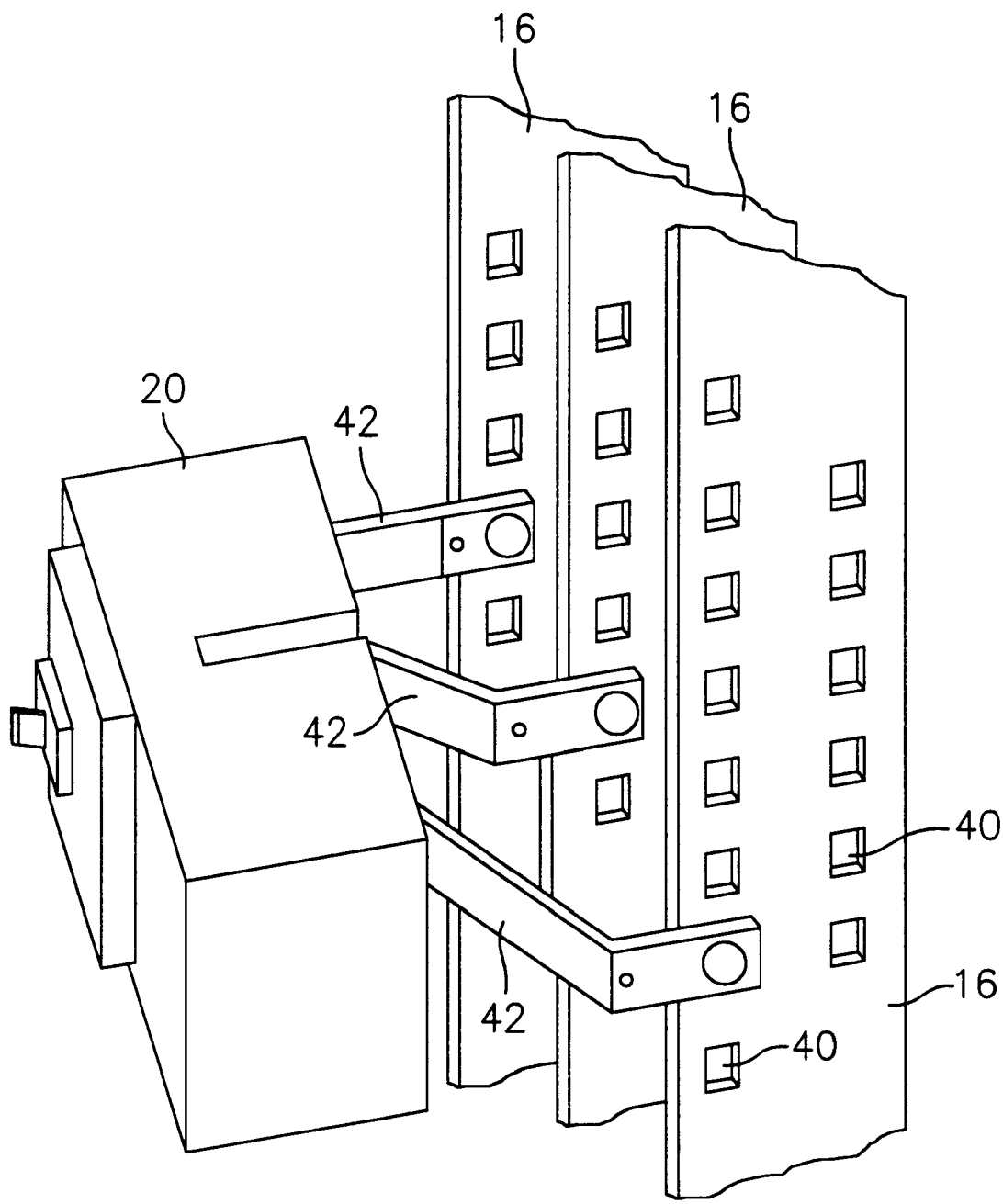
FIG. 5 is a perspective view of a module bolted to the bus bars.

FIG. 3 is a top view of the lugs 22 mounted to the bus bars 16. As shown in FIG. 3, insulative spacers 14 and bus bars 16 are coupled to the side brackets 12 by bolt 28 and nut 30. Lug 22 has a first portion 30 having a first dimension x along a first axis and a second portion 32 having a second dimension y along the first axis, smaller than the first dimension. This forms a planar shoulder 34 where second portion 32 meets first portion 30. When the lug 22 is mounted to bus bar 16, shoulder 34 is placed in contact with the edge of bus bar 16. The interference between the shoulder 34 and the bus bar 16 helps prevent the lug 22 from rotating. Lugs 22 are connected to the bus bar 16 through bolts 36 and nuts 38. FIG. 4 shows an alternate bolting arrangement where the lugs 22 are connected to bus bars 16 at openings 40 located at the rear of the bus bar 16 and shown in FIG. 5. This arrangement places more lug surface area in contact with each bus bar 16. As shown in FIG. 4, two bolts 36 pass through openings 40 formed in the bus bar 16 and through the second portion 32 of the lug 22 through lug openings 37 formed in the lugs 22. The use of two bolts 36 also prevents lug 22 from rotating. If one bolt is inadvertently not installed, the interference between the shoulder 34 and the bus bar 16 will prevent the lug 22 from rotating. As shown in FIG. 5, bus bars 16 include two rows of openings 40. The rows of openings are aligned with the longitudinal axis of the bus bar 16 and may span the entire length of bus bar 16 or a portion of the bus bar 16.

Figure 6:
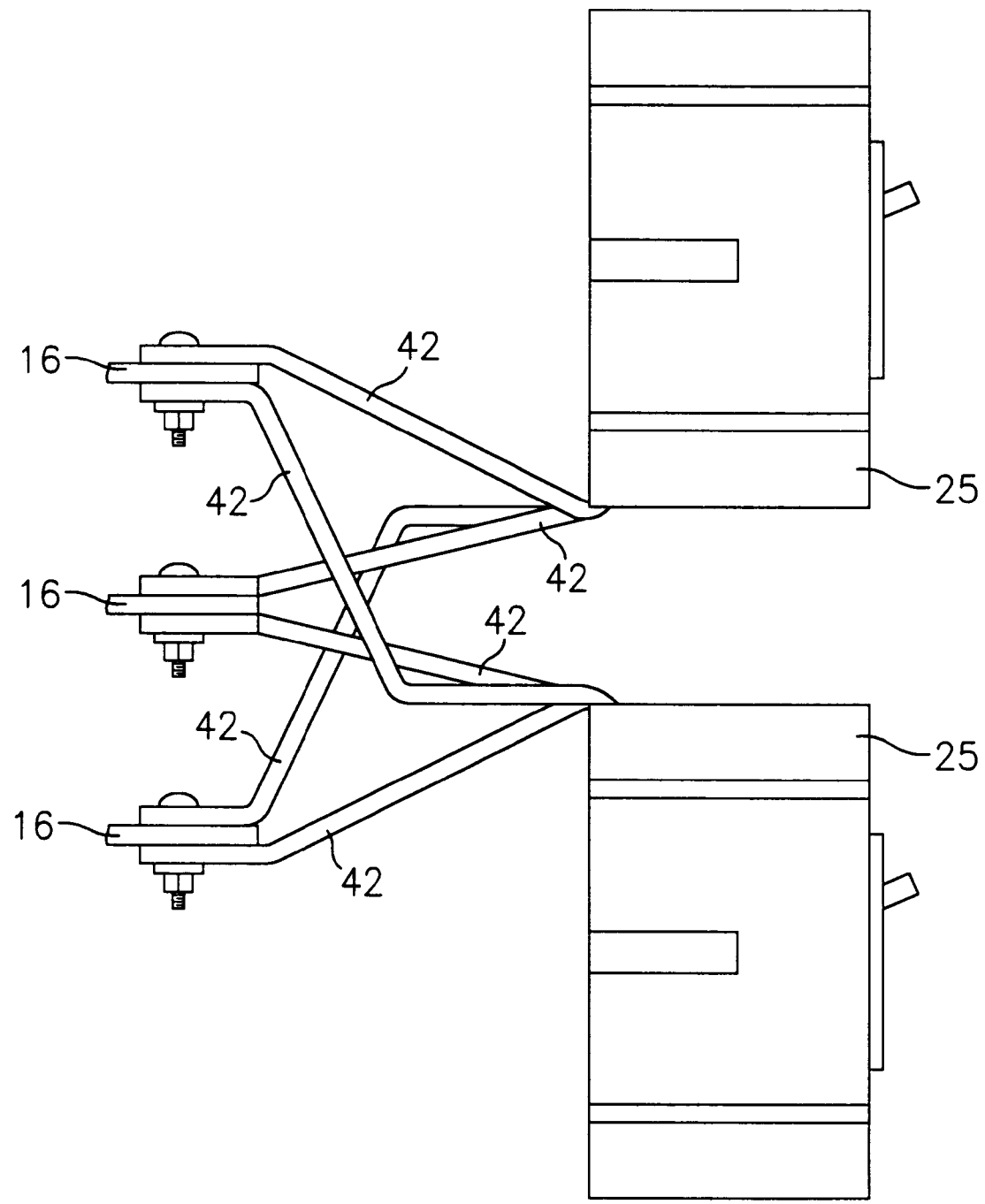
FIG. 6 is a top view of two modules bolted to the bus bars.
Figure 7:
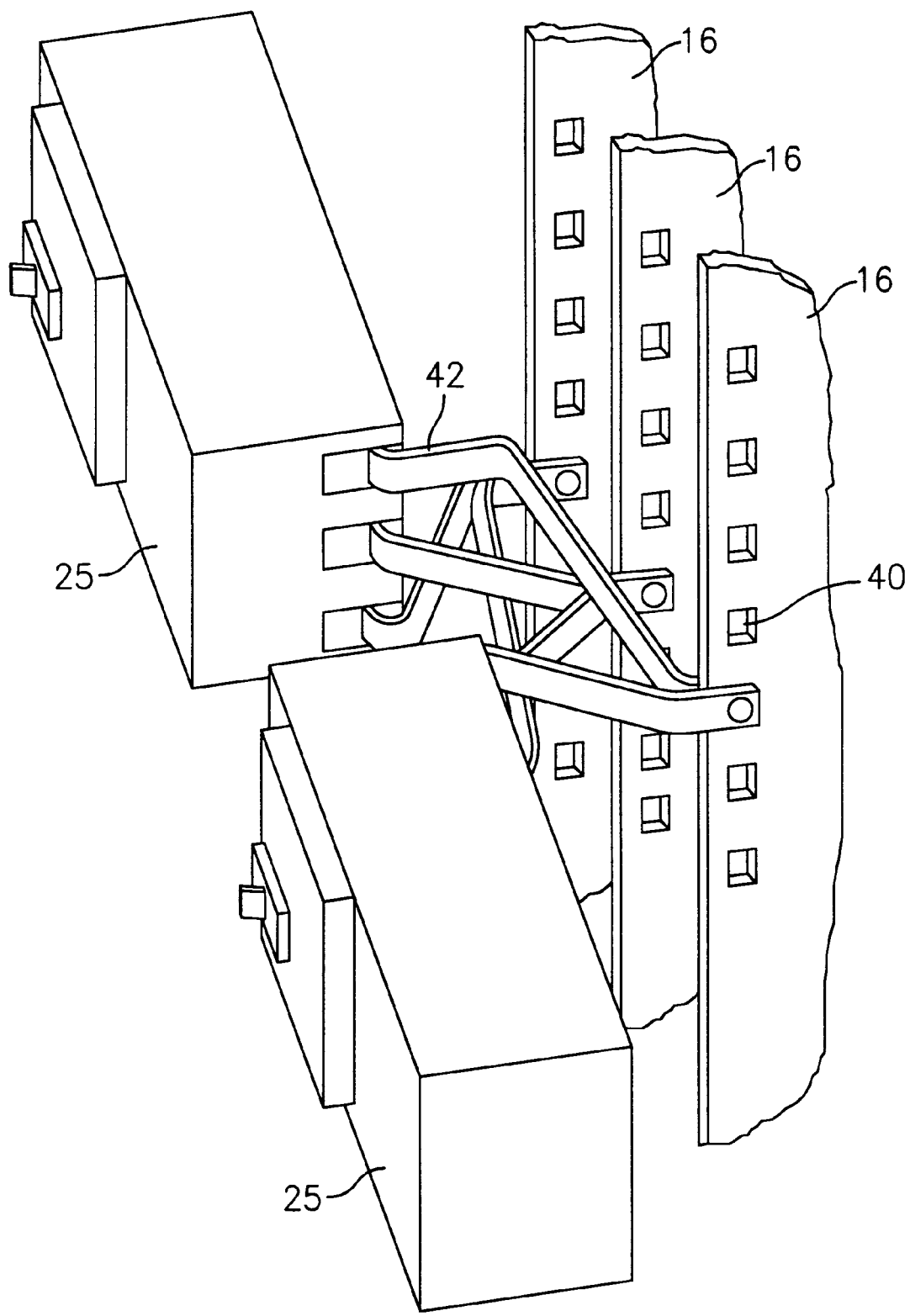
FIG. 7 is a perspective view of two modules bolted to the bus bars.
Figure 9B:
FIGS. 9A–9D are various shapes for providing anti-rotation.
Figure 9D:
Figure 9A:
Figure 9C:
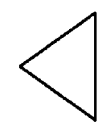

FIG. 5 is a perspective view of a module 20 attached to the bus bars 16 through a bolt-on connection. Straps 42 have a first end bolted to a respective bus bar 16 at openings 40 and a second end connected to module 20. As described below with reference to FIG. 8, the straps 42 are bolted to the bus bars 16 so as to prevent rotation of module 20. FIG. 6 is a top view showing two modules 25 connected to the bus bars 16 through straps 42. Two straps 42 are connected to each bus bar 16 to provide each phase to a respective module 25. FIG. 7 is a perspective view of the two modules 25 connected to the bus bars 16 through straps 42.

Figure 8:
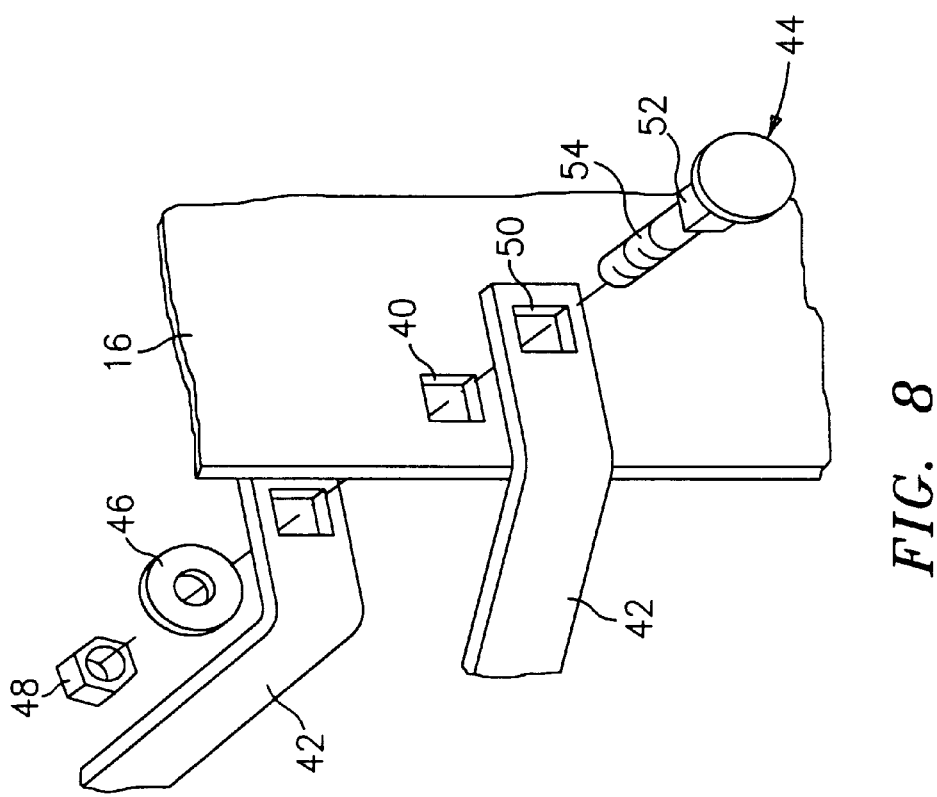
FIG. 8 is an exploded, perspective view of the connection between a bus bar and a pair of straps.

FIG. 8 is an exploded, perspective view of the connection between straps 42 and bus bar 16. Straps 42 include a strap opening 50 having the same shape as opening 40 in bus bar 16. In the embodiment shown in FIG. 8, openings 40 and strap openings 50 are square to prevent the straps 42 from rotating. It is understood that openings 40 and strap openings 50 may have different shapes (such as triangular, rectangular, pentagonal, hexagonal, etc.) but should include at least one linear element. FIGS. 9A–9D show various cross-sectional views of openings that would provide anti-rotation. The straps 42 are mounted to the bus bar 16 through bolt 44, washer 46 and nut 48. Bolt 44 is placed through strap opening 50 in a first strap 42, the opening 40 in the bus bar 16 and strap opening 50 in a second strap 42. The washer 46 is placed over the bolt 44 and nut 48 is tightened on the bolt 44. It is understood that straps 42 may be placed on the same side of bus bar 16 as opposed to straddling bus bar 16 as shown in FIG. 8.

The bolt 44 includes a threaded portion 54 and an anti-rotation portion 52 positioned adjacent to the bolt head. The anti-rotation portion 52 has the same shape as the openings 40 in the bus bars 16 and strap openings 50 in the straps 42. Anti-rotation portion 52 is positioned in strap opening 50 in the first strap 42, opening 40 in the bus bar 16 and strap opening 50 in the second strap 42. The interference between the anti-rotation portion 52, the opening 40 and strap openings 50 prevents the straps 42 from rotating which prevents the module connected to the straps 42 from rotating. Although two straps 42 are shown in FIG. 8, it is understood that the anti-rotation bolt 44 can be used in embodiments where only one strap 42 is connected to each bus bar 16 such as that shown in FIG. 5.

The bus bars are universal in that each receives plug-in modules, bolt-on modules and lugs. The ability of the bus bars to mate with a variety of components provides advantages over prior art panelboards. Modules do not have to be modified with a predetermined type of connector prior to installation in the panelboard. In addition, lugs can be easily mounted to the bus bars. The anti-rotation connection between the straps and the bus bars provides a stable mount.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A panelboard/switchboard assembly comprising:
    a plurality of vertically aligned bus bars, an edge of each of said bus bars being oriented towards a front of the panelboard, each of said bus bars including a plurality of bus bar through-holes having a predetermined through-hole length, said bus bar through-holes being aligned along the longitudinal axis of each bus bar; and
    said plurality of bus bar through-holes having a non-circular through-hole shape;
    a plurality of bolts having a non-circular shoulder shaped so as to engage any one of said plurality of bus bar through-holes and said engagement preventing said any one of said plurality of bolts from rotating while so engaged; and
    said plurality of bolts further having a non-circular shoulder length which exceeds said predetermined through-hole length so that a portion of said non-circular shoulder always protrudes from said bus bar through-hole when said shoulder is engaged with said bus bar through-hole.

2. The panelboard/switchboard assembly of claim 1 further comprising a lug directly mounted to at least one of said bus bars, including
    two lug through-holes formed in said lug, said two lug through-holes being aligned with two bus bar through-holes.

3. The panelboard/switchboard assembly of claim 1 further comprising a lug directly mounted to at least one of said bus bars, said lug including
    a first portion having a first dimension and a second portion having a second dimension smaller than said first dimension, and
    a shoulder where the first portion meets the second portion, said shoulder contacting the edge of said bus bar.

4. A panelboard/switchboard assembly comprising:
    a plurality of vertically aligned bus bars, an edge of each of said bus bars being oriented towards a front of the panelboard, each of said bus bars including a plurality of bus bar through-holes aligned along the longitudinal axis of each bus bar;
    at least one strap having a first end fixedly connected to one of said bus bars and having a second end; and
    a module fixedly connected to said second end of said strap so that said strap bears the full gravitational load of said module to said bus bar through said strap.

5. The panelboard/switchboard assembly of claim 4 wherein:
    said first end of said strap has a strap through-hole formed therein, said strap through-hole having a shape having at least one linear element; and
    one of said through-holes in said bus bar has said shape.

6. The panelboard/switchboard assembly of claim 5 wherein:
    each of said plurality of bus bar through-holes have a non-circular through-hole shape; and further including:
        a plurality of bolts having a non-circular shoulder shaped so as to engage any one of said plurality of bus bar through-holes and said engagement preventing said any one of said plurality of bolts from rotating while so engaged; and said plurality of bolts further having a non-circular shoulder length which exceeds said predetermined through-hole length so that a portion of said non-circular shoulder always protrudes from said bus bar through-hole when said shoulder is engaged with said bus bar through-hole;

said strap through-hole engaging said non-circular shoulder extending out of a second end of said one of said bus bar through-holes;

wherein any rotational or translational load mechanically transmitted to said strap second end is further transmitted to said bus bar.

7. The panelboard/switchboard assembly of claim 4 wherein said at least one strap is two physically independent straps connected to one of said bus bars.

8. The panelboard/switchboard assembly of claim 7 wherein:

each of said two physically independent straps has a strap through-hole formed therein, said strap through-hole having a shape having at least one linear element; and one of said through-holes in said bus bar has said shape.

9. The panelboard/switchboard assembly of claim 8 further comprising:

a bolt having a threaded portion and an anti-rotation portion, said anti-rotation portion being received in said strap through-hole in each of said two straps and said one of said through-holes, said anti-rotation portion having said shape.

10. A panelboard/switchboard assembly comprising:

a plurality of vertically aligned bus bars, an edge of each of said bus bars being oriented towards a front of the panelboard, each of said bus bars including a plurality of openings aligned along the longitudinal axis of each bus bar; any one of said plurality of bus bars having a different electric potential from any other said bus bar;

a plurality of tubular insulative spacers distributed in a serial manner along a mounting rod, said rod being fixed to said panelboard/switchboard, wherein each one of said plurality of bus bars is electrically insulated from said any other said bus bar by said tubular spacers; and one of said openings having a shape including one linear element.

11. The panelboard/switchboard assembly of claim 10 wherein said openings are positioned in two rows and said rod is oriented in essentially a horizontal manner in said panelboard.

12. The panelboard/switchboard assembly of claim 1 further comprising:

a plurality of tubular insulative spacers distributed in a serial manner along a mounting rod, said rod being fixed to said panelboard/switchboard, wherein said plurality of bus bars are electrically separated from each other by said tubular spacers.

13. The panelboard/switchboard assembly of claim 1 wherein said module may be one of a circuit breaker, disconnect switch, bolt-on module, electric switch, monitoring device or plug-in module.

14. A panelboard/switchboard assembly of claim 1 further comprising a module having a plurality of push-on connectors, said push-on connectors fixedly mounting said module on said plurality of bus bars.

15. The panelboard/switchboard assembly of claim 2 wherein said two lug openings are similarly shaped as said non-circular bus bar through-holes.

16. A panelboard/switchboard assembly of claim 2 wherein said lug further includes a plurality of connector openings to receive electrical coupling cables.

17. A panelboard/switchboard assembly of claim 16 further comprising:

wherein said two-lug openings are aligned with a rearward row of through-holes in said bus bar.

18. A panelboard/switchboard assembly of claim 16 wherein said lug further includes a threaded clamping hole which intersects said connector openings; each said clamping hole having a threaded stud for clamping said connector cables in said connector openings.

19. A panelboard/switchboard assembly of claim 16 wherein said lug openings are essentially orthogonal to said connector openings which are essentially orthogonal to said clamping holes.

20. A panelboard/switchboard assembly of claim 4 wherein said straps are fixedly connected by bolts at both said ends.

* * * * *